(12) United States Patent
Chang

(10) Patent No.: US 8,016,432 B2
(45) Date of Patent: Sep. 13, 2011

(54) PROJECTION APPARATUS

(75) Inventor: Kun-Rong Chang, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 313 days.

(21) Appl. No.: 12/478,780

(22) Filed: Jun. 5, 2009

(65) Prior Publication Data
US 2010/0103384 A1 Apr. 29, 2010

(30) Foreign Application Priority Data
Oct. 28, 2008 (TW) ................................ 97141462 A

(51) Int. Cl.
G03B 21/28 (2006.01)

(52) U.S. Cl. .......................................... 353/70; 348/745

(58) Field of Classification Search ..................... 353/69, 353/70, 79; 348/744–747
See application file for complete search history.

(56) References Cited

U.S. PATENT DOCUMENTS

| 6,612,704 | B2 | 9/2003 | Ogawa | |
| 7,239,360 | B2 | 7/2007 | Bassi et al. | |
| 7,891,825 | B2 * | 2/2011 | Kimura et al. | 353/99 |
| 7,901,097 | B2 * | 3/2011 | Hirata et al. | 353/122 |
| 7,914,153 | B2 * | 3/2011 | Hirata et al. | 353/70 |
| 7,946,715 | B2 * | 5/2011 | Yamauchi et al. | 353/85 |
| 2002/0181130 | A1 | 12/2002 | Ohzawa | |
| 2007/0103604 | A1 | 5/2007 | Yoshikawa et al. | |

FOREIGN PATENT DOCUMENTS

| EP | 1965254 | 9/2008 |
| JP | 2001264627 | 9/2001 |
| TW | 00436661 | 5/2001 |
| TW | 1234050 | 6/2005 |

OTHER PUBLICATIONS

Hitachi-CP-A100 User's Manual, <http://www.aboutprojectors.com/pdf/hitachi-cp-a100-manual.pdf>, retrieved on Dec. 24, 2008.
Hitachi-CP-A100, <http://www.hitachi.com.au/Admin/uploads/Documents/df811286-a7f3-4f9e-b418-0a00911f6920.pdf>, retrieved on Dec. 24, 2008.
Hitachi CP-A100J Projector—CyberTheater, <http://www.cybertheater.com/hitachi-cp-a100j-projector/>, retrieved on Dec. 25, 2008.
Hitachi's Ultra Short Throw LCD Projectors, <http://www.educom.ie/images/projectors/eda100_datasheet.pdf>, retrieved on Dec. 25, 2008.
Originated Free Form Surface Technology, Hitachi A8 Creates Minimum Distance Projection, <http://office.pconline.com.cn/solution/0803/1237177.html>, published on Mar. 5, 2008.

* cited by examiner

Primary Examiner — Seung C Sohn
(74) Attorney, Agent, or Firm — Jianq Chyun IP Office

(57) ABSTRACT

A projection apparatus adapted to be disposed on a surface and adapted to project an image frame onto the surface is provided. The projection apparatus includes a housing, an optical engine, a projection lens, a containing sink, an extension rod, and a curved surface reflection device. The optical engine is disposed in the housing, and capable of providing an image beam. The projection lens is disposed in the transmission path of the image beam. The containing sink is disposed on the housing and has a containing space. The extension rod is movably connected to the containing sink. The curved surface reflection device is pivotally connected to the extension rod. The extension rod and the curved surface reflection device are adapted to be contained in the containing space. The curved surface reflection device has a curved reflective surface capable of reflecting the image beam to the surface.

16 Claims, 6 Drawing Sheets

PROJECTION APPARATUS

CROSS-REFERENCE TO RELATED APPLICATION

This application claims the priority benefit of Taiwan application serial no. 97141462, filed on Oct. 28, 2008. The entirety of the above-mentioned patent application is hereby incorporated by reference herein and made a part of specification.

BACKGROUND OF THE INVENTION

1. Field of the Invention

The present invention relates to a display apparatus. More particularly, the present invention relates to a projection apparatus.

2. Description of Related Art

With development of projection display technique, the projection apparatus has been widely applied to people's daily life. Since the projection apparatus may project an image frame with a size thereof larger than a size of a general large-size television, while a cost thereof is lower than that of the general large-size television, it has an irreplaceable place in the display domain. For example, academic units or companies generally apply the projection apparatus for teaching or briefing since the projected large-size image frames are suitable for being simultaneously viewed and discussed by a plurality of people. Moreover, the projection apparatus also become main equipments for home theaters.

Generally, the projection apparatus is disposed on a desktop or is hung to a ceiling. The projection apparatus disposed on the desktop is hard to project an image frame onto the desktop. If the image frame is constrainedly projected onto the desktop, the image frame has a shape of trapezium due to an oblique projection. Objects in the trapezium-shape image frame are deflective and are not suitable for viewing. Moreover, though the projection apparatus hung to the ceiling may project the image frame onto the desktop, time and cost are spent for assembling the projection apparatus to the ceiling. In addition, once the position of the desktop is changed, reassembling of the projection apparatus is required, so as to lead to more consumption of human labor, time and assembling cost. Moreover, the projection apparatus assembled to the ceiling may not be carried to other places for utilization, such that applicability of the projection apparatus is decreased.

SUMMARY OF THE INVENTION

The present invention is directed to a projection apparatus, disposed on a desktop and adapted to project an image frame with relatively less obliquity onto the desktop.

An embodiment of the present invention provides a projection apparatus adapted to be disposed on a surface and adapted to project an image frame onto the surface. The projection apparatus includes a housing, an optical engine, a projection lens, a containing sink, an extension rod, and a curved surface reflection device. The optical engine is disposed within the housing and is capable of providing an image beam. The projection lens is disposed in the transmission path of the image beam, and the housing exposes a part of the projection lens. The containing sink is disposed on the housing and has a containing space. The extension rod is movably connected to the containing sink. The curved surface reflection device is pivotally connected to the extension rod. The extension rod and the curved surface reflection device are adapted to be contained in the containing space, and the extension rod is capable of moving with respect to the containing sink, so as to protrude out of the containing space. When the extension rod protrudes out of the containing space, the curved surface reflection device is adapted to be rotated to the transmission path of the image beam. The curved surface reflection device has a curved reflective surface capable of reflecting the image beam to the surface to form the image frame.

Since the projection apparatus according to the embodiments of the present invention has the curved surface reflection device, the projection apparatus may be disposed on a surface for projecting an image frame with relatively less obliquity onto the surface. Moreover, the curved surface reflection device may also amplify a size of the image frame. In addition, since the projection apparatus according to the embodiments of the present invention has the containing sink for containing the curved surface reflection device and the extension rod, the projection apparatus is easy to be carried around, so as to improve an applicability of the projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
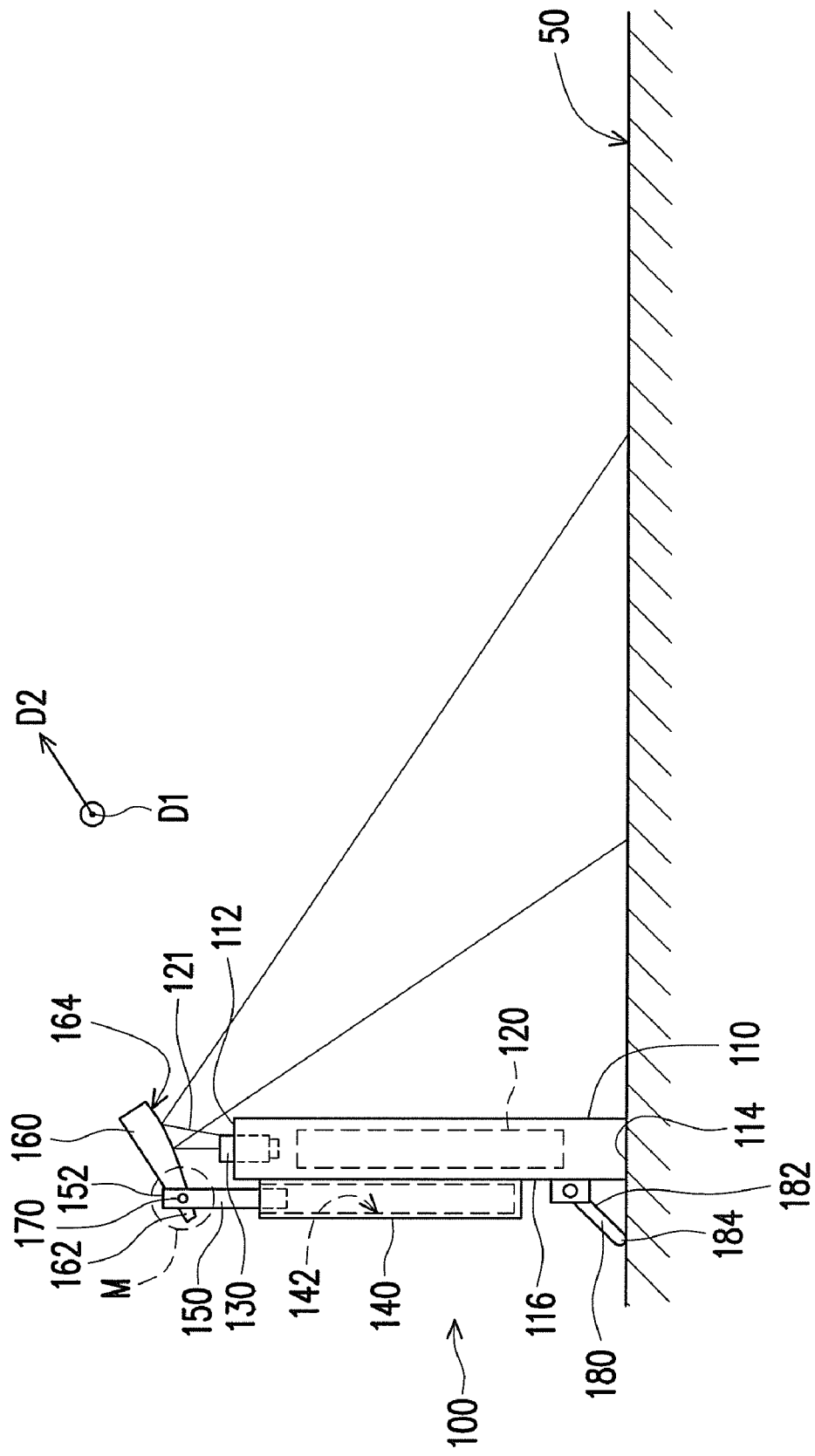
FIG. 1A is a structural schematic diagram illustrating a projection apparatus according to an embodiment of the present invention.
Figure 1B:
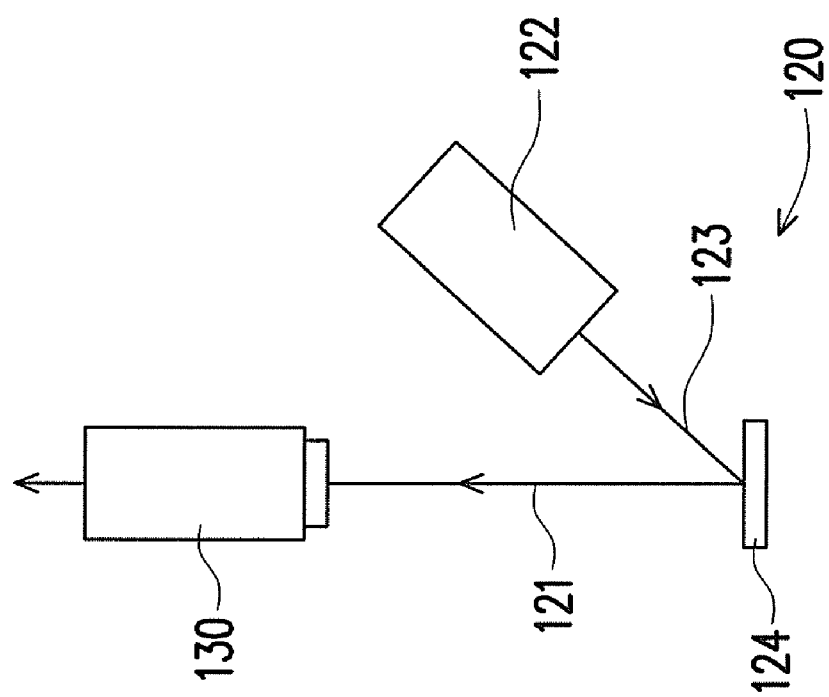
FIG. 1B is a structural schematic diagram illustrating an optical engine and a projection lens of FIG. 1A.
Figure 1C:
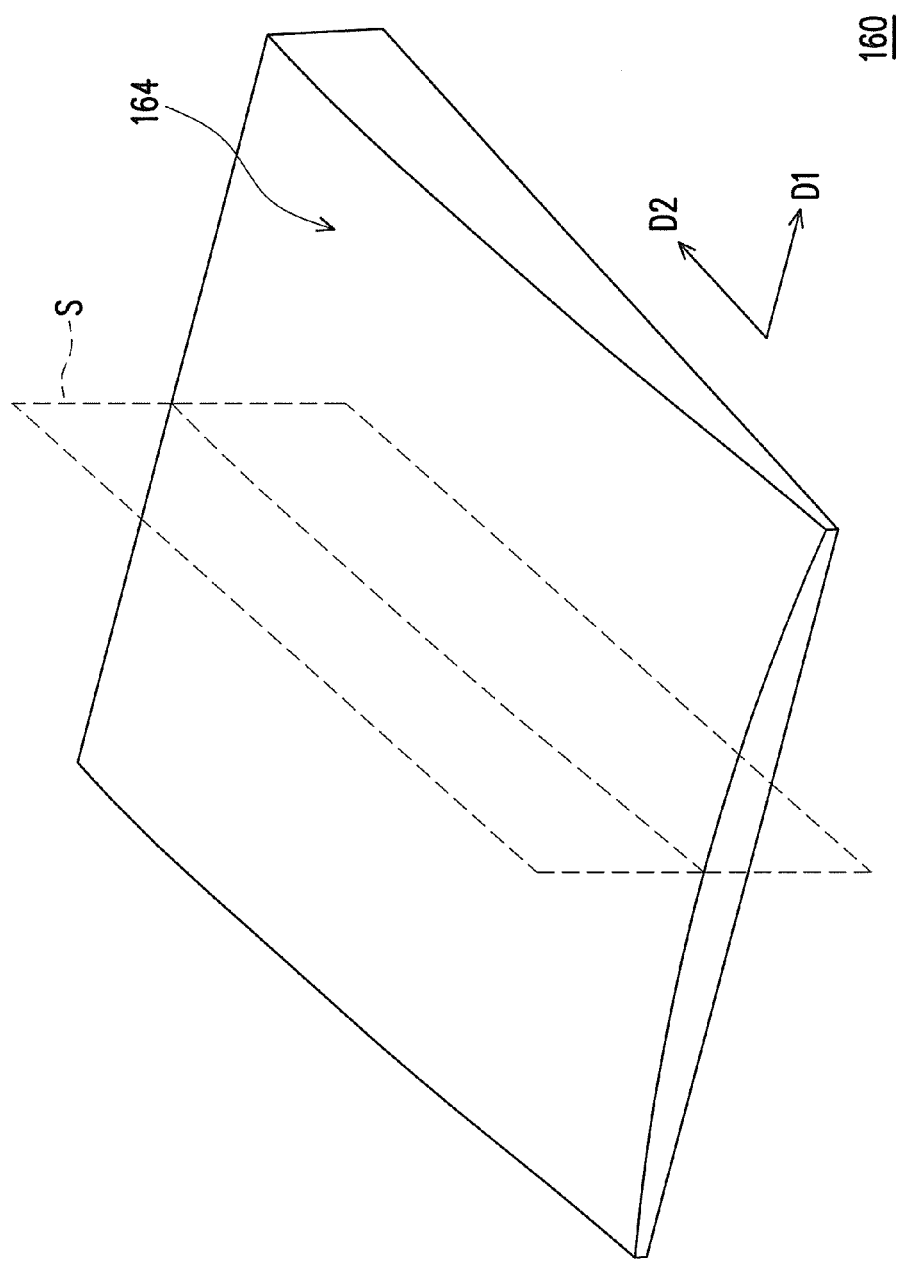
FIG. 1C is a three-dimensional view of a curved surface reflection device of FIG. 1A.

FIG. 1A is a structural schematic diagram illustrating a projection apparatus according to an embodiment of the present invention. FIG. 1B is a structural schematic diagram illustrating an optical engine and a projection lens of FIG. 1A. FIG. 1C is a three-dimensional view of a curved surface reflection device of FIG. 1A. Referring to FIGS. 1A to 1C, the projection apparatus 100 of the embodiment of the present invention is adapted to be disposed on a surface 50 and adapted to project an image frame onto the surface 50, wherein the surface 50 is, for example, a desktop, a table, or a surface of other object. The projection apparatus 100 includes a housing 110, an optical engine 120, a projection lens 130, a containing sink 140, an extension rod 150, and a curved surface reflection device 160. The optical engine 120 is disposed in the housing 110 and is capable of providing an image beam 121. In the embodiment of the present invention, the optical engine 120 includes an illumination system 122 and a light valve 124. The illumination system 122 is capable of providing an illumination beam 123. The light valve 124 is disposed in the transmission path of the illumination beam 123 and is capable of converting the illumination beam 123 into an image beam 121, wherein the light valve is, for example, a digital micromirror device (DMD) or a liquid crystal on silicon panel (LCOS panel). The projection lens 130 is disposed in the transmission path of the image beam 121, and the housing 110 exposes a part of the projection lens 130. The containing sink 140 is disposed on the housing 110 and has a containing space 142.

In the embodiment of the present invention, the housing 110 includes a top plate 112, a bottom plate 114, and a back plate 116. The top plate 112 exposes a part of the projection lens 130, and another part of the projection lens 130 is located inside the housing 110. The bottom plate 114 is disposed opposite to the top plate 112, and the projection apparatus 100 leans against the surface 50 through the bottom plate 114. The back plate 116 connects the top plate 112 and the bottom plate 114, and the containing sink 140 is disposed on the back plate 116. The extension rod 150 is movably connected to the containing sink 140. The curved surface reflection device 160 is pivotally connected to the extension rod 150. In the embodiment of the present invention, the curved surface reflection device 160 has a first pivotal terminal 162, the extension rod 150 has a second pivotal terminal 152, and the curved surface reflection device 160 is pivotally connected to the second pivotal terminal 152 via a shaft 170 at the first pivotal terminal 162.

The extension rod 150 and the curved surface reflection device 160 are adapted to be contained in the containing space 142, and the extension rod 150 is capable of moving with respect to the containing sink 140, so as to protrude out of the containing space 142. When the extension rod 150 protrudes out of the containing space 142, the curved surface reflection device 160 is adapted to be rotated to the transmission path of the image beam 121. In the embodiment of the present invention, the curved surface reflection device 160 is rotated about the shaft 170.

The curved surface reflection device 160 has a curved reflective surface 164 capable of reflecting the image beam 121 to the surface 50 to form the image frame. In the embodiment of the present invention, the curved reflective surface 164 is curved in a first direction D1 and is curved in a second direction D2 perpendicular to the first direction D1. The radius of curvature of the curved reflective surface 164 in the first direction D1 and the radius of curvature of the curved reflective surface 164 in the second direction D2 fall within a range of 150 millimeters to 600 millimeters. Moreover, in the embodiment of the present invention, the curved reflective surface 164 has a symmetric plane S perpendicular to the first direction D1, and a left part and a right part of the curved reflective surface 164 are symmetrical with respect to the symmetric plane S. Moreover, in the embodiment of the present invention, the curvature of the curved reflective surface 164 in the first direction D1 is greater than the curvature of the curved reflective surface 164 in the second direction D2.

Figure 2:
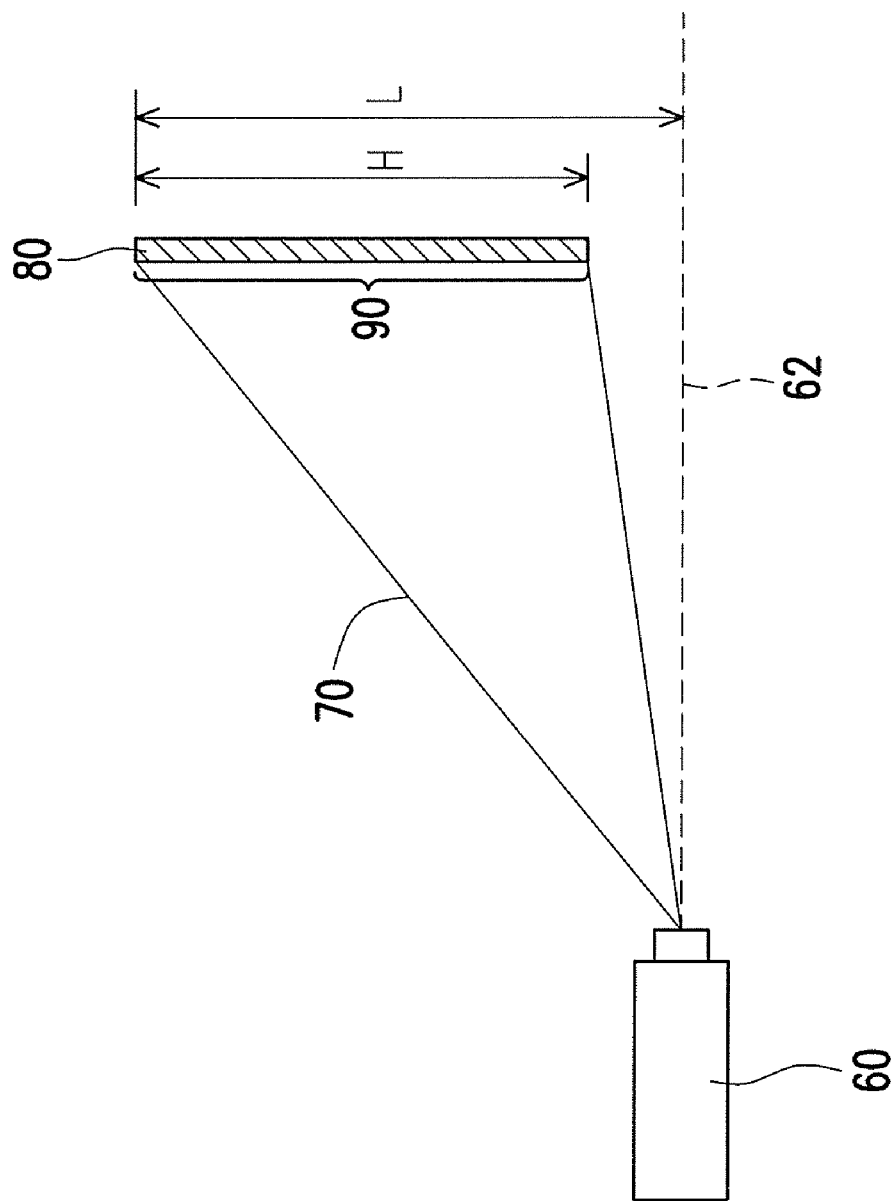
FIG. 2 is a schematic diagram illustrating a definition of projection offset.

FIG. 2 is a schematic diagram illustrating the definition of projection offset. Referring to FIG. 2, a status that a projection lens 60 projects an image beam 70 onto a screen 80 is illustrated, and the projection offset of an image frame 90 formed on the screen 80 by the image beam 70 is defined as (L/H)*100%, where L is a distance between an optical axis 62 of the projection lens 60 and an end of the image frame 90 far away from the optical axis 62, and H is a distance between the end of the image frame 90 far away from the optical axis 62 and another end of the image frame 90 closed to the optical axis 62.

Referring to FIGS. 1A to 1C, the projection offset of the image frame projected by the projection apparatus 100 of the embodiment of the present invention is greater than 100%, and is preferably 120%-130%. Therefore, the image beam 121 reflected by the curved reflective surface 164 may not enter the projection lens 130 again. Moreover, the projection apparatus 100 of the embodiment of the present invention applies the curved surface reflection device 160 to reflect the image beam 121, and the curved reflective surface 164 may modify the image frame from a trapezium to a rectangle. Therefore, though the projection offset is greater than 100%, and the image beam 121 is obliquely projected to the surface 50, the image frame projected by the projection apparatus 100 of the embodiment of the present invention may be relatively not distorted, and the image frame is substantially a rectangular frame or an approximate rectangular frame. By such means, when the projection apparatus 100 is disposed on the surface 50, the projection apparatus 100 may project the image frame having relatively small distortion onto the surface 50. If the surface 50 is a desktop, the image frame projected on the desktop avails carrying out of a meeting. Moreover, since the projection apparatus is disposed on the surface 50, and an extra assembling process is not required, the projection apparatus 100 may be quickly moved to desktops or other surfaces of different places for utilization, such that applicability of the projection apparatus 100 is increased, and consumption of assembling time and cost may be avoided. In addition, since the extension rod 150 and the curved surface reflection device 160 may be contained in the containing space 142, a user may carry the projection apparatus 100 around, such that a usage opportunity of the projection apparatus 100 is increased.

Moreover, the curved reflective surface 164 may also amplify the image frame. According to an optical simulation method, it is known that when a projection distance is the same, a diagonal length of the image frame projected by the projection apparatus 100 applying the curved surface reflection device 160 is 1.5 times a diagonal length of an image frame projected by a projection apparatus not applying the curved surface reflection device 160, such that the curved surface reflection device 160 is verified actually having the function of amplifying the image frame.

In the embodiment of the present invention, the projection apparatus 100 further includes a foot stand 180 having a first terminal 182 and a second terminal 184 opposite to the first terminal 182. The first terminal 182 is rotatably connected to the housing 110. In the embodiment of the present invention, the first terminal 182 is rotatably connected to the back plate 116 for example. Moreover, the second terminal 184 is adapted to be disposed on the surface 50, such that the projection apparatus 100 may be erected on the surface 50. It should be noted that in other embodiments, the projection apparatus may also not have the foot stand, and the projection apparatus may be erected on the surface 50 by means of the back plate 114 leaning against the surface 50.

Figure 3A:
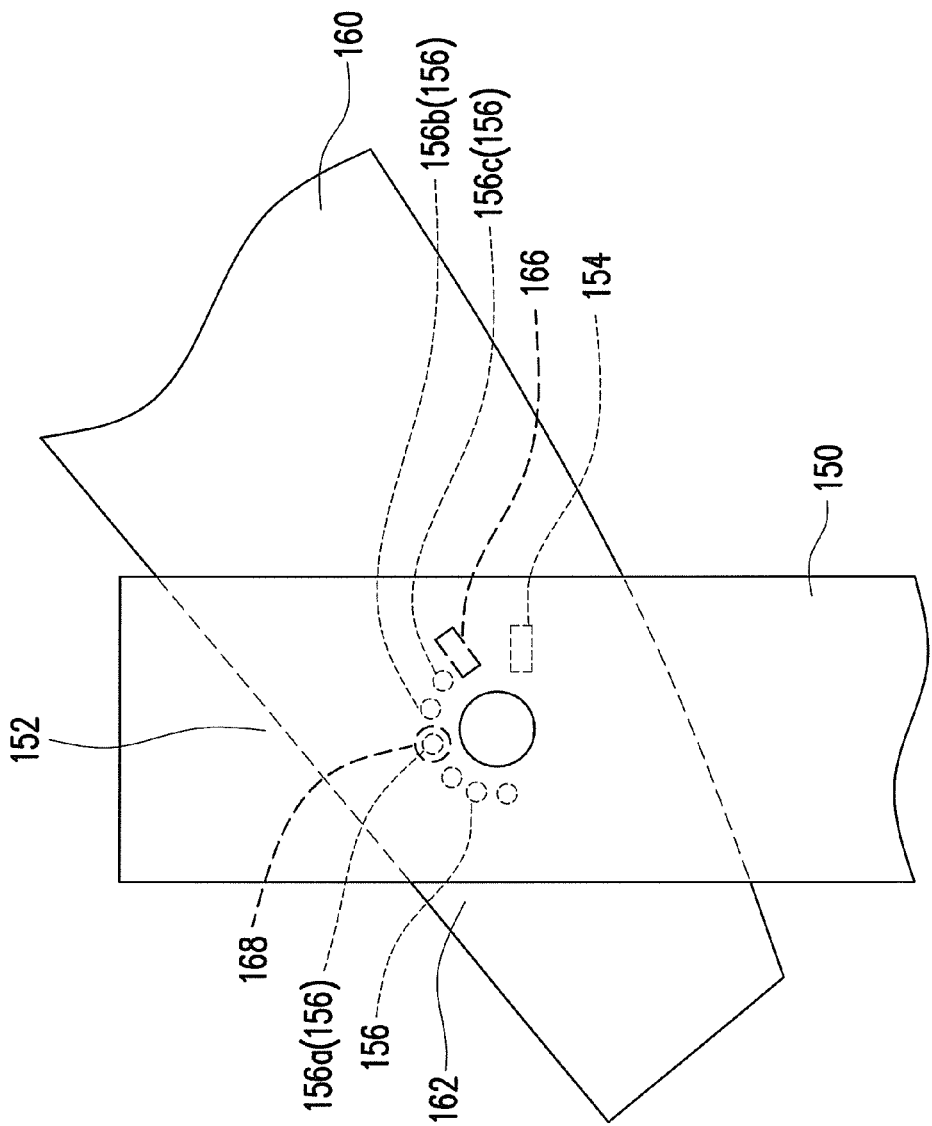
FIG. 3A is a perspective amplified diagram of the M region of the projection apparatus of FIG. 1A.
Figure 3B:
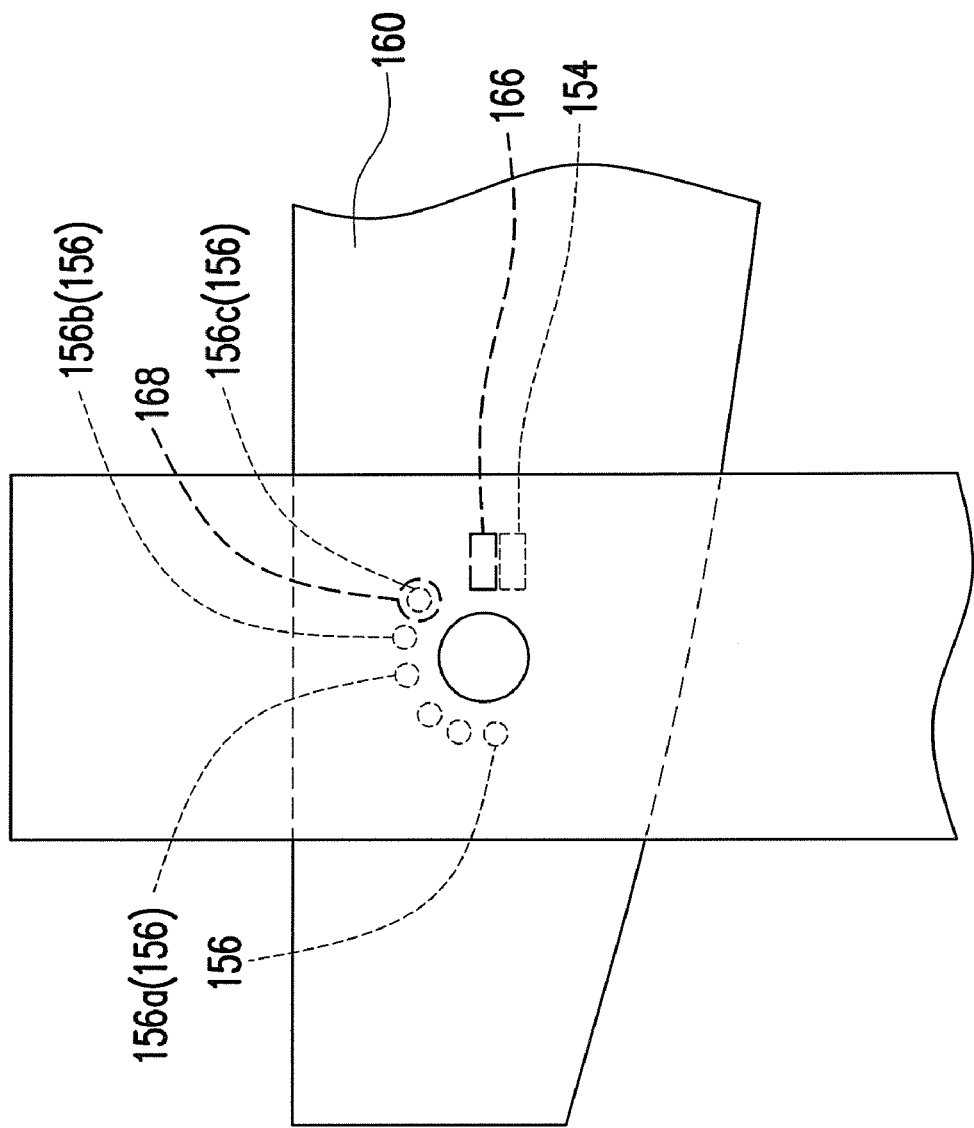
FIG. 3B is a perspective amplified diagram of the curved surface reflection device of FIG. 3A when being rotated to another angle.

FIG. 3A is a perspective amplified diagram of the M region of the projection apparatus of FIG. 1A. FIG. 3B is a perspective amplified diagram of the curved surface reflection device of FIG. 3A when being rotated to another angle. Referring to FIG. 1A, FIG. 3A and FIG. 3B, in the embodiment of the present invention, the first pivotal terminal 162 of the curved surface reflection device 160 has a first block part 166, and the second pivotal terminal 152 of the extension rod 150 has a second block part 154. The second block part 154 is adapted to block the first block part 166 to limit a rotation angle of the curved surface reflection device 160. For example, the first block part 166 and the second block part 154 are protrusions, and when the curved surface reflection device 160 is rotated to a position shown as FIG. 3B, the second block part 154 may block the first block part 166, such that the curved surface reflection device 160 may not be continually rotated clockwise, and impact between the curved surface reflection device 160 and the projection lens 130 due to careless operation may be avoided.

Moreover, in the embodiment of the present invention, the first pivotal terminal 162 of the curved surface reflection device 160 has a first fitting part 168, and the second pivotal terminal 152 of the extension rod 150 has a plurality of second fitting parts 156. In the embodiment of the present invention, the first fitting part 168 is, for example, a recess, and the second fitting parts are, for example, protrusions. However, in other embodiment of the present invention, the first fitting part 168 and the second fitting parts 156 may also be respectively a protrusion or recesses. When the curved surface reflection device 160 is rotated, the first fitting part 168 is sequentially fitted to the second fitting parts 156. For example, when the curved surface reflection device 160 is clockwise rotated from an angle shown in FIG. 3A to an angle shown in FIG. 3B, the first fitting part 168 may be sequentially fitted to the second fitting parts 156a, 156b and 156c. When the first fitting part 168 is fitted to the second fitting part 156, if the curved surface reflection device 160 is not exerted an external force, the curved surface reflection device 160 stops in the current position and is not rotated. However, if an enough external force is exerted to the curved surface reflection device 160, the curved surface reflection device 160 is then rotated, and the first fitting part 168 departs from the original fitted second fitting part 156 and moves towards a next adjacent second fitting part 156. Positions of the first fitting part 168 and the second fitting part 156 may be designed according to actual requirement, such that when the first fitting part 168 is fitted to the second fitting part 156, the curved surface reflection device 160 may be stopped in a suitable position and a suitable angle, and therefore the projection apparatus 100 may project a suitable image frame.

It should be noted that in the present invention, quantities of the first fitting part 168 and the second fitting part 156 are not respectively limited to be one and plurality. In other embodiment of the present invention, quantities of the first fitting part 168 and the second fitting part 156 may be respectively plurality and one, and when the curved surface reflection device 160 is rotated, the second fitting part 156 may be sequentially fitted to the first fitting parts 168, wherein one of the first fitting part 168 and the second fitting part 156 is a protrusion, and another one of the first fitting part 168 and the second fitting part 156 is a recess.

In summary, since the projection apparatus according to the embodiments of the present invention applies the curved surface reflection device to reflect the image beam, and the curved reflective surface thereof may modify the image frame from the trapezium to the rectangle, the image frame projected by the projection apparatus may be relatively not distorted, and the image frame is substantially a rectangular frame or an approximate rectangular frame. By such means, when the projection apparatus is disposed on a surface, the projection apparatus may project a better image frame onto the surface. Moreover, since the projection apparatus is disposed on the surface, and an extra assembling process is not required, the projection apparatus may be quickly moved to desktops or other surfaces of different places for utilization, such that applicability of the projection apparatus is increased, and consumption of assembling time and cost may be avoided. In addition, since the extension rod and the curved surface reflection device may be contained in the containing space, a user may carry the projection apparatus around, such that a usage opportunity of the projection apparatus is increased. Further, the curved reflective surface also has a function of amplifying the image frame.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, adapted to be disposed on a surface and adapted to project an image frame onto the surface, the projection apparatus comprising:
    a housing;
    an optical engine, disposed in the housing and capable of providing an image beam;
    a projection lens, disposed in the transmission path of the image beam, wherein the housing is capable of exposing a part of the projection lens;
    a containing sink, disposed on the housing, and having a containing space;
    an extension rod, movably connected to the containing sink; and
    a curved surface reflection device, pivotally connected to the extension rod, wherein the extension rod and the curved surface reflection device are adapted to be contained in the containing space, and the extension rod is capable of moving with respect to the containing sink so as to protrude out of the containing space, when the extension rod is capable of protruding out of the containing space, the curved surface reflection device is adapted to be rotated to the transmission path of the image beam, and the curved surface reflection device has a curved reflective surface capable of reflecting the image beam to the surface to form the image frame.

2. The projection apparatus as claimed in claim 1, wherein a projection offset of the image frame is greater than 100%.

3. The projection apparatus as claimed in claim 2, wherein the image frame is substantially a rectangular frame.

4. The projection apparatus as claimed in claim 1, wherein the curved reflective surface is curved in a first direction and is curved in a second direction perpendicular to the first direction.

5. The projection apparatus as claimed in claim 4, wherein a radius of curvature of the curved reflective surface in the first direction and a radius of curvature of the curved reflective surface in the second direction fall within a range of 150 millimeters to 600 millimeters.

6. The projection apparatus as claimed in claim 4, wherein the curved reflective surface has a symmetric plane perpendicular to the first direction, and a left part and a right part of the curved reflective surface are symmetrical with respect to the symmetric plane.

7. The projection apparatus as claimed in claim 6, wherein a curvature of the curved reflective surface in the first direction is greater than a curvature of the curved reflective surface in the second direction.

8. The projection apparatus as claimed in claim 1, wherein the curved surface reflection device has a first pivotal terminal, the extension rod has a second pivotal terminal, and the curved surface reflection device is pivotally connected to the second pivotal terminal via a shaft at the first pivotal terminal.

9. The projection apparatus as claimed in claim 8, wherein the first pivotal terminal has a first block part, the second pivotal terminal has a second block part, and the second block part is adapted to block the first block part to limit a rotation angle of the curved surface reflection device.

10. The projection apparatus as claimed in claim 8, wherein the first pivotal terminal has a first fitting part, the second pivotal terminal has a plurality of second fitting parts, and when the curved surface reflection device is rotated, the first fitting part is sequentially fitted to the second fitting parts.

11. The projection apparatus as claimed in claim 10, wherein one of the first fitting part and the second fitting part is a recess, and another one of the first fitting part and the second fitting part is a protrusion.

12. The projection apparatus as claimed in claim 8, wherein the first pivotal terminal has a plurality of first fitting parts, the second pivotal terminal has a second fitting part, and when the curved surface reflection device is rotated, the second fitting part is sequentially fitted to the first fitting parts.

13. The projection apparatus as claimed in claim 12, wherein one of the first fitting part and the second fitting part is a recess, and another one of the first fitting part and the second fitting part is a protrusion.

14. The projection apparatus as claimed in claim 1, wherein the housing comprises:
    a top plate, exposing a part of the projection lens;
    a bottom plate, disposed opposite to the top plate, wherein the projection apparatus leans against the surface through the bottom plate; and
    a back plate, connecting the top plate and the bottom plate, wherein the containing sink is disposed on the back plate.

15. The projection apparatus as claimed in claim 14 further comprising a foot stand having a first terminal and a second terminal opposite to the first terminal, wherein the first terminal is rotatably connected to the housing, and the second terminal is adapted to lean against the surface, so as to erect the projection apparatus on the surface.

16. The projection apparatus as claimed in claim 15, wherein the first terminal is rotatably connected to the back plate.

* * * * *